United States Patent Office

3,481,790
Patented Dec. 2, 1969

3,481,790
SEAWATER RESERVE BATTERY HAVING MAGNESIUM ANODE AND LEAD DIOXIDE-GRAPHITE FABRIC CATHODE
Joseph C. Duddy, Trevose, Pa., assignor to ESB Incorporated, a corporation of Delaware
No Drawing. Filed Aug. 29, 1967, Ser. No. 663,975
Int. Cl. H01m 41/02
U.S. Cl. 136—100         3 Claims

ABSTRACT OF THE DISCLOSURE

A seawater reserve battery having a magnesium anode and a cathode consisting of a thin deposit of $PbO_2$ on a graphite fabric grid.

Cross-references to related applications

This application is related to the following others:
(1) "Graphite Fabric Electrode or Grid," Ser. No. 663,969, by Joseph C. Duddy, filed August 29, 1967;
(2) "Electrochemical Cell Having a Graphite Fabric Electrode" Ser. No. 663,970, by Joseph C. Duddy, filed Aug. 29, 1967;
(3) "Battery Having Magnesium or Zinc Anode, Manganese Dioxide Cathode, and Seawater Electrolyte" Ser. No. 663,976, by John B. Ockerman, filed Aug. 29, 1967, now Patent No. 3,433,678; and
(4) "Battery Having Lead Dioxide Cathode, Magnesium or Zinc Anode, and Potassium Acid Sulfate Electrolyte" Ser. No. 664,070, by Joseph C. Duddy, filed Aug. 29, 1967.

All five applications have common filing dates and common ownership.

Background of the invention

The combination of a magnesium anode and a lead dioxide cathode is not new, but the previous use of this combination of active materials has been limited to certain specific electrolytes which have not included seawater. For examples of the electrolytes in which these materials have been used, see Patent No. 2,492,206, issued to J. C. White et al. (electrolyte is perchloric acid) and Patent No. 2,612,534, issued to I. C. Blake (electrolyte is $MgCl_2 \cdot 6H_2O + Mg(NO_3)_2 \cdot 6H_2O$ in $CH_3OH$).

The use of the combination of a magnesium anode and a lead dioxide cathode in a seawater electrolyte would have been impractical until now because the product of discharge, lead oxide, is highly insoluble in seawater. A cathode having any substantial thickness of lead dioxide would have been impractical because the layer of lead oxide which would form on the outer surface of the active material deposit quickly after cell discharge began would have blocked access of the electrolyte to the remainder of the lead dioxide on the interior of the deposit; in other words, the interior of the thick deposit would not have been used.

Summary of the invention

If a lead dioxide cathode is to be used in seawater electrolyte with a magnesium anode, the lead dioxide must be deposited in a very thin layer on a grid or substrate having a very large surface area. Only in this manner can efficient use be made of the lead dioxide.

This invention takes advantage of a known method of depositing thin layers of lead dioxide (plating out of a lead nitrate bath) to construct a cathode having a high surface area substrate, particularly a substrate of graphite fabric. The resultant cathode may be efficiently used with a magnesium anode in seawater electrolyte.

Description of the preferred embodiment

The battery of this invention comprises a magnesium anode, a cathode consisting of lead dioxide deposited on a high surface area substrate, and an electrolyte of seawater. Preferably the substrate is made from a fabric, and more particularly still the fabric consists of graphite.

Fabrics have an important property which make them desirable as substrates on which to deposit lead dioxide, namely high surface area. Most fabrics, however, are not made from materials which permit a thin layer of lead dioxide to be easily deposited over the large surface area offered by the many filaments within the fabric.

The high surface area of a fabric is attributable to the fact that it is made from yarns, each of which is made up of numerous filaments. While the surface area of one filament is not great, when the total surface area of all filaments in a yarn is computed a comparatively large value is obtained. When the yarns are in turn made into a fabric, the numerous yarns required produce a fabric having a very large surface area.

In recent years processes have been developed by which fabric or cloth made from rayon may be converted into graphite. Such graphite fabrics seem well suited for use as substrates on which to deposit lead dioxide, for they combine the desirable property of high surface area with another desirable property of graphite, namely its good electrical conductivity. An additional advantage of a graphite fabric would be its flexibility which permits the electrode to be folded or curved into numerous configurations.

The high electrical conductivity of graphite is an advantage offered by a graphite fabric. Graphite is frequently added to active materials in electrodes to improve conductivity, and an electrode having a graphite substrate would have very fine conductivity.

Compared with carbon or metallic fabric substrates having equal surface areas, those made from graphite fabric are potentially much less expensive.

The flexibility of a graphite fabric is still another advantage which this material offers when used as a substrate. The flexible fabric may easily be rolled into a spiral or convolution, or may be folded back and forth with ease. To achieve high surface metallic or carbon substrates having these configurations would require very difficult and expensive manufacturing techniques, and the resulting substrates would be more difficult to assemble into cells than is the flexible graphite fabric.

The method by which the fabric is constructed is not to be taken as a limitation on the present invention. The fabric may be woven, knitted, flocked, or matted. If the graphite fabric is created from rayon, any method which produces a graphite fabric product may be used.

Typical of the graphite fabrics suitable for use as a substrate is one identified as "Graphite Cloth Grade WCB" (a product of Union Carbide) and another identified as "Avceram" (a product of FMC Corporation). These fabrics appear to have a surface area of from 2 to 5 square meters per gram, which is greater than that of the lead dioxide frequently used in the plates of the lead-acid automobile battery.

Any sitisfactory separator materials and current collectors (if the latter is desired) may be used with this invention.

To illustrate the utility of the invention to be claimed below, a cell was constructed and discharged in sea-water electrolyte. Using a magnesium anode, a cathode comprising a thin layer of lead dioxide deposited on a graphite fabric (the deposit was obtained using a lead nitrate bath, a known technique for depositing lead dioxide onto other substrates), a Fibrite separator, and a free supply of seawater electrolyte, the cell so constructed was discharged at a rate of 30 ma./sq. in.; initial voltage was 1.34 volts and at the end of 120 minutes the voltage was 1.20 volts.

The advantages of the graphite fabric related above, together with additional advantages relating to porosity and electrochemical catalytic properties, make the graphite fabric an excellent material from which to construct electrodes for use in converting gaseous oxidants from the elemental to the ionic form. The first of the cross-referenced related application listed above claims such as electrode, and the second application claims an electrochemical cell containing such an electrode. The third cross-referenced related application differs from this one in that manganese dioxide is used with magnesium or zinc in seawater rather than lead dioxide; magnesium dioxide and zinc may also be used with an alkaline electrolyte. Very thick deposits of manganese dioxide may be used, together with various substrates. The last of the cross-referenced related applications claims the same combination of metals as this application, magnesium and lead dioxide, but in a different electrolyte.

I claim:
1. A reserve battery comprising a magnesium anode, a cathode consisting of lead dioxide deposited on a substrate, and seawater electrolyte.
2. The battery of claim 1 in which the substrate is made from a conductive fabric.
3. The battery of claim 2 in which the fabric consists of graphite.

References Cited
UNITED STATES PATENTS 2,492,206  12/1949  White et al.
2,612,534  9/1952  Blake.

WINSTON A. DOUGLAS, Primary Examiner

A. SKAPARS, Assistant Examiner

U.S. Cl. X.R.

136—26